| GEAR | FRICTION CLUTCHES | | | JAW CLUTCHES | | | RATIO |
|---|---|---|---|---|---|---|---|
| | A | B | C | D | E | F | |
| 1 | | | | ● | ● | ● | 2.30 |
| 2 | | | ● | ● | ● | | 1.78 |
| 3 | ● | | | | ● | ● | 1.40 |
| 4 | ● | | ● | | ● | | 1.08 |
| 5 | ● | ● | | | | ● | .89 |
| 6 | ● | ● | ● | | | | .70 |

Fig. 6

United States Patent Office 3,362,245
Patented Jan. 9, 1968

3,362,245
POWERSHIFT TRANSMISSION
Charles Francuch, Royal Oak, Alfred J. Welch, Jr., Dearborn, and Otto Mueller, Jr., Detroit, Mich., assignors to Massey-Ferguson Inc., Detroit, Mich.
Filed Dec. 23, 1965, Ser. No. 515,994
23 Claims. (Cl. 74—359)

This invention relates to vehicle transmissions and more particularly to heavy duty vehicle transmissions of the type wherein ratio changes can be made under load while the vehicle is in motion.

In order to provide for the easy shifting under torque between different speed ratios of a vehicle transmission such as that used in heavy duty vehicles, e.g. tractors, trucks, etc., there have been developed transmissions that incorporate overrunning or one-way drive clutches. By using such a clutch in combination with a two-way drive clutch it has been possible to provide a transmission in which at least some of the gear ratio changes can be made by merely moving a valve controlling a single fluid operated element. The overruning clutch due to its torque directional characteristic, acts to automatically take over or release the drive through the transmission in response to the two-way drive clutch releasing or taking over the drive. In particular, the use of a jaw type clutch provides positive simple automatic torque or drive establishment without the problems associated with friction bands which require a relatively large diameter and require frequent adjustment for wear. Friction bands also require complex timing and pressure control of the band application and release. The use of a jaw clutch eliminates the service and cost problems associated with sprag or roller type overrunning type clutches.

In order to overcome one inherent disadvantage of overrunning clutches, that is their inability to transmit torque in a reverse direction so as to take advantage of engine braking when the vehicle is coasting, it has been proposed to provide a lockout of the overunning effect by use of a hydraulic piston means to hold the overrunning clutch teeth in two-way driving engagement. This hydraulic lockout of the overrunning effect is of course desirable only when the overrunning clutch is in torque transmitting engagement. Any tendency towards hydraulic lockout of the clutch when the clutch is disengaged will cause unnecessary ratcheting and high torque loads on the clutch. This is especially true where the overrunning clutch is of the jaw tooth type.

It is therefore an object of the invention to provide an overrunning jaw clutch which can automatically transmit torque in one direction at all times, and will also transmit torque in a reverse direction when required. It is a further object that the reverse direction torque transmission of the clutch be so controlled so as not to interfere the normal overrunning drive torque establishment and disestablishment operation.

It is still a further object of the invention to provide a two-part overrunning clutch having cooperating teeth which tend to provide a positive drive in one direction and overruning ratcheting in the other direction. The teeth are urged together by a spring and are at certain times urged together by a hydraulic piston. The invention provides that the pressure on the hydraulic piston will be effective only when the teeth are engaged and will not therefore interfere with normal ratcheting of the teeth during overrun or during tooth engagement when the clutch is taking over the torque transmission.

It is further an object of the invention to provide a multiple speed transmission incorporating a plurality of overrunning clutch devices in combination with fluid actuated two-way clutches that can easily be controlled by a simple hydraulic fluid control system to provide a plurality of gear ratio speeds. The transmission incorporating the invention further provides for simple changes between the gear ratios while transmission is under torque, that is the drive from the engine to the vehicle wheels need not be interrupted during the ratio change.

An additional object of the invention is to provide a heavy duty transmission having six forward speeds and three reverse speeds. This transmission includes three hydraulically controlled overrunning jaw clutches and three hydraulically operated friction clutches. The changes between forward, neutral and reverse drive are manually effected.

These and other objects, features, and advantages will be readily apparent to those skilled in the art from the following description and accompanying drawings in which.

Briefly, the invention involves a transmission having at least one pair of different gear trains connecting two shafts of a transmission. A two-way clutch, such as a fluid actuated friction clutch, is provided for establishing drive through one of the gear trains and an overrunning jaw type clutch is provided for automatically establishing one-way drive through the other gear train when the two-way gear clutch is disengaged. The teeth of the jaw clutch are constructed to separate and overrun when the torque is transmitted through the two-way clutch controlled gear train. Means are provided to automatically prevent separation of the jaw teeth when the two-way clutch is disengaged, with a positive control of the means on the teeth so as to not interfere with the normal torque establishing tooth engaging action of the clutch. This control provides that the tooth separation prevention means acts only to prevent separation and not to cause engagement and therefore is not effective except when the teeth are engaged.

In one form of the invention there is provided a transmission that utilizes two-way and one-way clutch combinations to provide two dual speed gear units in series each using a one-way clutch and a two-way clutch for providing alternative drives of different ratios and a third unit using a two-way clutch and a one-way clutch in parallel to one of the dual speed units to provide a third speed in series with the other dual speed unit and thus provide an overall six speed unit in which the shifts between adjacent speed ratios are accomplished by engaging or disengaging a single two-way clutch and a one-way clutch provides for automatic torque transmission before or after the engagement or release of the two-way clutch. Fluid actuated means are provided to prevent overrun of the one-way clutches which are preferably of the jaw tooth type, during the time that they are transmitting full torque and allow overrun of these clutches during ratio changes and when the two-way clutches are transmitting the torque.

The means to prevent separation of the clutch jaws of the one-way clutch is preferably a fluid actuated means such as a piston controlled by a valve which also controls the actuation and deactuation of the two-way drive clutch. The separation prevention control is achieved by limiting the rate of fluid flow to the fluid actuated means in combination with a position responsive valve means for preventing build up of the fluid pressure that acts to prevent separation, until after the teeth are in actual driving contact. Means are also provided for allowing rapid deactuation of the separation preventing means so as to not interfere with overrunning tooth disengagement when the two-way clutch is again in operation.

Figure 1:
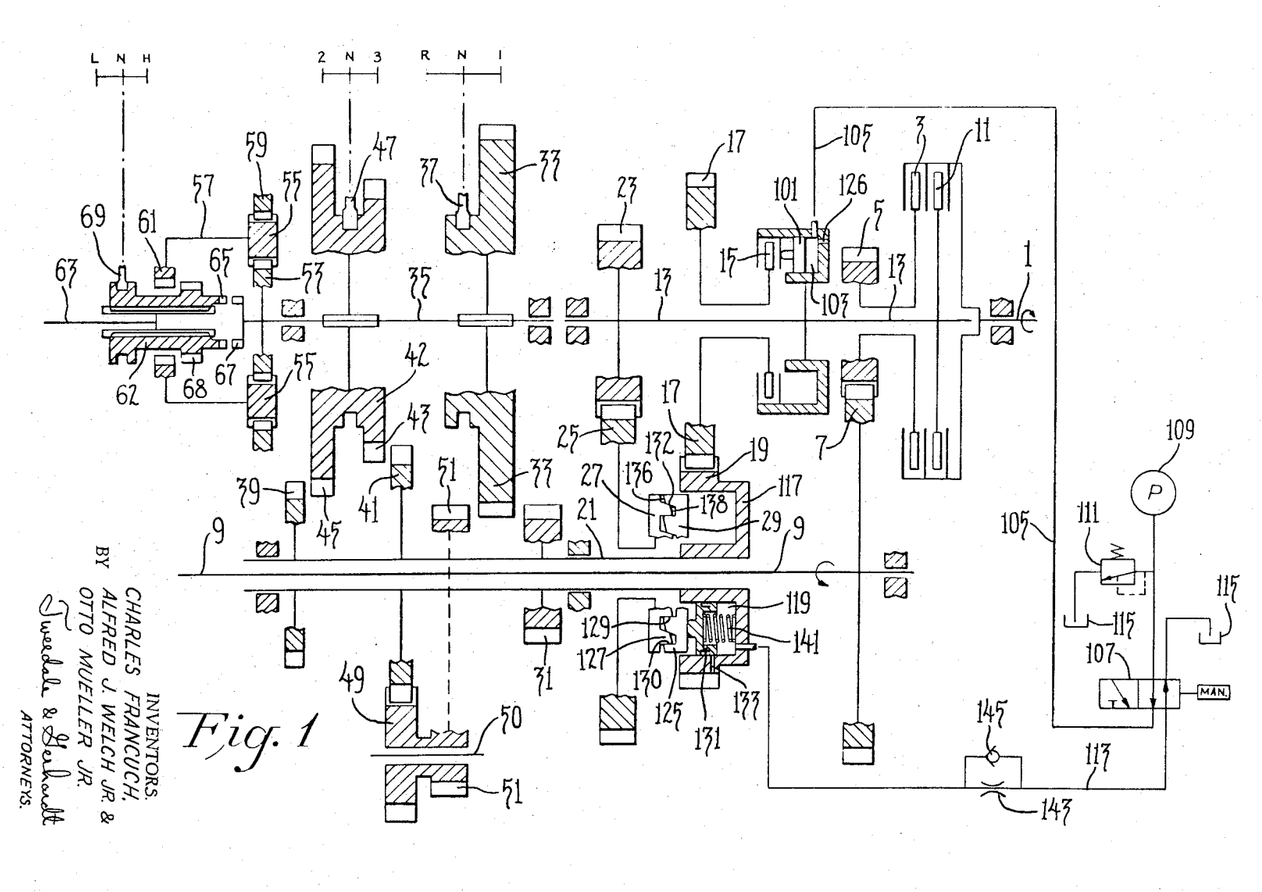
FIG. 1 is a schematic and diagrammatic illustration of one form of transmission incorporating the invention.
Figures 2, 3:
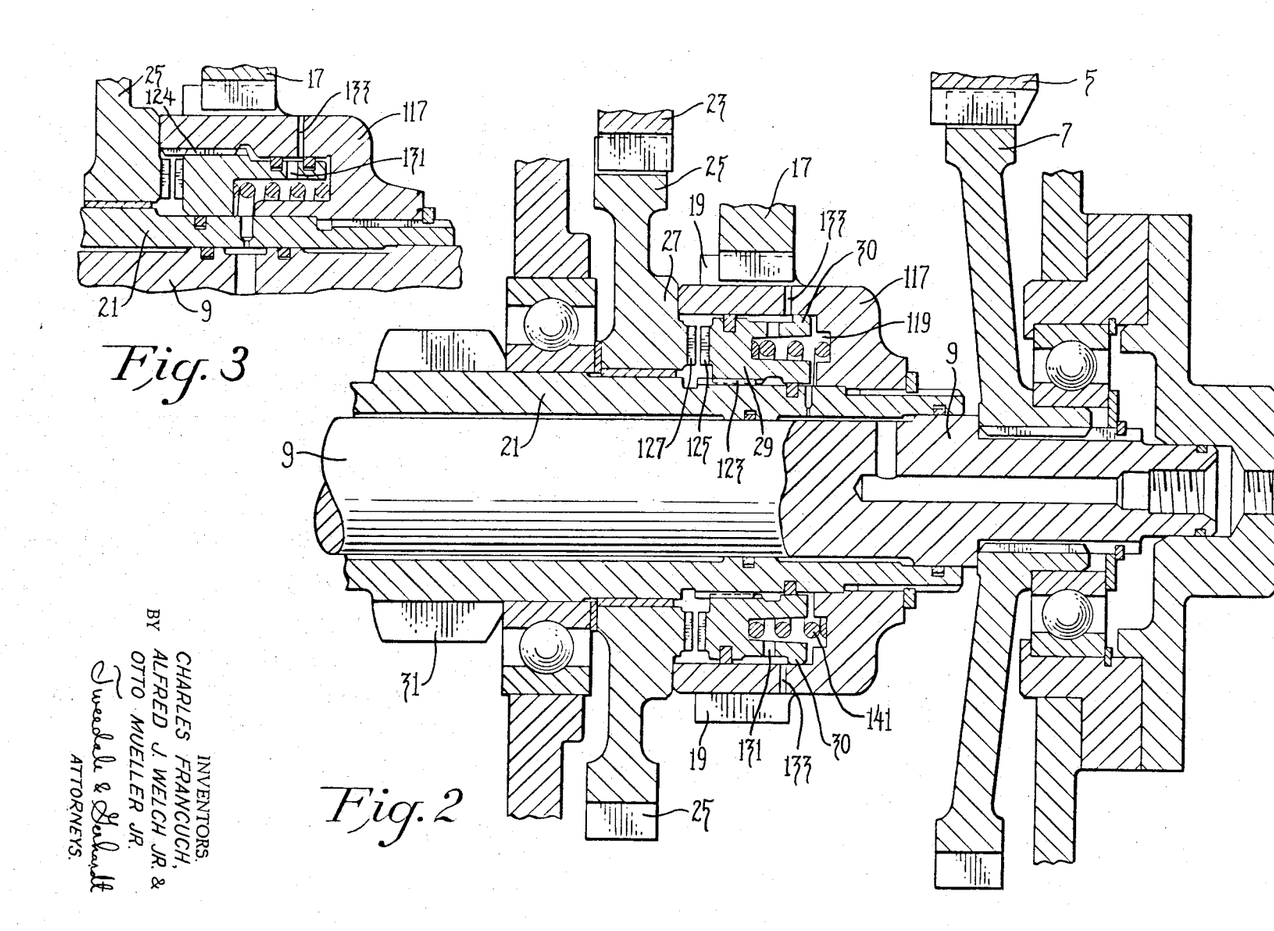
FIG. 2 is a detailed cross sectional view of a portion of the transmission of FIG. 1 and showing details of the overrunning clutch and its control elements.
FIG. 3 is a view similar to FIG. 2 showing a modified form of overrunning clutch which could be used in the transmission of FIG. 1.

The figures show two applications of the invention. Thus, FIGS. 1, 2, and 3 show an application of the invention wherein a single overrunning jaw clutch is used in the transmission to provide for a plurality of power shifts. This arrangement requires some of the ratio shifts to be made by manual means and which shifts require disengagement of the main clutch connecting the engine with the transmission. The transmission shown in FIGS. 4, 5, and 6 on the other hand, illustrates an application of the invention to a six speed transmission in which all of the ratio changes are power shifts and are made by manipulation of a single valve and which requires no disengagement of the drive or torque from the engine to the transmission or to the vehicle wheels.

Referring now to FIG. 1 which schematically illustrates the first application of the invention, 1 is an input shaft adapted to be connected to a vehicle engine. A friction clutch 3, which may be operated by any suitable means, not shown, is arranged to connect the shaft 1 with a gear 5. The gear 5 meshes with a larger gear 7 secured to a countershaft 9. This shaft 9 is suitable for providing a power take-off controlled by clutch 3 such as is common on tractors.

A second friction clutch 11, also operated by a suitable means, not shown, is arranged to connect the input shaft 1 with an intermediate shaft 13 coaxial with the shaft 1. A friction disc type clutch 15, operable by means to be described below, is arranged to connect the shaft 13 with a gear 17 rotatably mounted on a shaft 13. The gear 17 meshes with a gear 19 secured to a hollow countershaft 21 surrounding the power take-off shaft 9. Secured to the shaft 13 is a gear 23 of smaller diameter than the gear 17. This gear 23 meshes with a gear 25 rotatably mounted on the countershaft 21.

The gear 25 can be connected for drive of shaft 21 by means of a two piece jaw type clutch having a first member 27 operably connected to or integral with the gear 25 and a second member 29 operably connected to the shaft 21.

The shaft 21 has a first speed gear 31 secured thereon. This gear 31 is adapted to mesh with a larger diameter gear 33 that is secured for rotation with but axially movable on a shaft 35, coaxial with the shafts 13 and 1. The gear 33 can be shifted by means of a shifter fork 37, from a non-meshing position shown, into engagement with the gear 31.

Also secured to the countershaft 21 is an intermediate diameter, second speed, gear 39, as well as a large diameter, third speed gear 41. The gears 39 and 41 can be selectively and operably connected to shaft 35 by means of a multiple diameter gear member 42 having gear portions 43 and 45. The gear member 42 is secured to rotation with shaft 35 but is axially slideable thereon by a shifter fork member 47 between the neutral position shown to a third gear position wherein gear 43 engages gear 41, or to a second gear position wherein gear 45 engages gear 39.

The 3rd gear 41 is in constant mesh with a reverse idler gear 49 mounted on an idler shaft 50, which for the purposes of illustration is shown out of its actual location. The reverse idler gear 49 carries a smaller diameter gear 51 adapted to be engaged by the gear 33 when shifted by the fork 37 to the left from position shown in FIG. 1.

Near its left hand end, the shaft 35 is connected to a sun gear 53 that meshes with a plurality of planet pinions 55 journalled on a carrier member 57. A ring gear 59 also meshes with the planet pinion 55 and is fixed to a stationary portion of the transmission. The planet carrier 57 is connected to an internally splined member 61. A sliding coupler 62 is splined on a transmission output shaft 63 and carries coupler teeth 65 adapted to engage with teeth 67 formed on the end of shaft 35. The coupler 62 also has a splined tooth portion 68 adapted to engage the internally splined member 61. A shifter fork 69 is provided to axially move the coupler member from position shown in FIG. 1 to the right, whereby teeth 65–67 engage, or to the left whereby members 61–68 engage.

The high clutch 15 is actuated by a piston 101 formed in an annular cylinder 103 secured for rotation with shaft 13. Fluid under pressure is supplied to the cylinder 103 through a connection 105 leading to a two position, manually controlled valve 107. A pump 109 supplies fluid under pressure to the valve 107 and a regulator valve 111 acts to maintain the pressure at a predetermined value. The valve 107 in the position shown in FIG. 1 connects passage 105 to the pump pressure and a passage 113 to a fluid sump 115.

The jaw clutch 27–29 and its operating piston shown diagrammatically in FIG. 1 are shown in detail in FIG. 2. The gear 19 is formed with a bell shaped hub 117 which in combination with the sleeve shaft 21 forms an annular cylinder 119. The right hand portion 29 of the jaw clutch is formed as annular piston connected to the shaft 21 by means of helical splines 123. The piston member 29 has jaw teeth 125 on the face thereof which cooperate with corresponding teeth 127 formed on the face of the hub portion of gear 25.

When the gear 25 and teeth 127 thereon are driven in a forward direction by shaft 13 and gear 23, and the clutch 15 is released, the surfaces 129 (FIG. 1) of the teeth 127 positively drive the surfaces 130 on the teeth 125. When the clutch 15 is engaged to drive gear 19, the shaft 21 and member 29 are driven at a faster rate than member 25. At this time the axial component of the driving torque on the angled faces 132 and 134 on the teeth 125 and 127, acts to separate the teeth and members 25 and 29 and the teeth ride past each other on the radial faces 136 and 138. The helical splines 123 also aid in the separation of the teeth due to the axial component of the driving force between the member 29 and the shaft 21.

When the clutch 15 is again released, the gear 19, shaft 21 and member 29 slow down relative to member 25 until the teeth 125 and 127 are rotating at the same speed. A bias spring 141 then moves member 29 into the tooth engaged position shown in FIG. 2 and the drive is again through the gears 23–25.

Referring now again to FIG. 1, it will be seen that when the valve 107 is moved to the right, it acts to connect pump 109 to passage 113 whereby fluid passes through a restriction 143 to the cylinder 119. When the overrunning clutch is in tooth disengaged condition as shown in FIG. 2, the fluid entering the cylinder 119 is allowed to escape through a port 131 formed in the piston 29 and through a relief port 133 formed in the bell shaped member 117. Thus, there can be no buildup of pressure in the chamber 119 to act on the piston and the only force acting to move the teeth 125 and 127 into engagement is that of the biasing spring 141. At the same time that the valve 107 admits fluid to the line 113 it cuts off pressure to clutch chamber 103 and the pressure acting on piston 101 that acts to apply the clutch 15 is relieved through a restricted port 126. As the clutch 15 is released, the load on the engine is relieved causing it to speed up and drive the clutch member 27 faster. The spring 141 then acts to move the teeth into driving engagement as shown in FIG. 1. The drive at this time is from the input shaft 1 through the main clutch 11, the intermediate shaft 13, the gear 23, gear 25, and the overrunning jaw clutch 27–29 through the splines 123 to the sleeve shaft 21.

It will be noted from examination of FIGS. 1 and 2 that when the teeth are in engagement as shown in FIG. 1, the piston 29 will have moved to a point where a flange 30 formed thereon cuts off the relief passage 133 and allows the pressure in the chamber 119 to build up and hold the piston member 29 with its teeth 125 in driving engagement with the teeth 127 even though the direction of the drive between the teeth should reverse. By preventing the build up of pressure in cylinder 119 until after the teeth are engaged the effects of the pressure on the tooth engagement which might cause extreme tooth wear, chattering and high tooth loads can be eliminated, and the spring 144 remains the only force acting on the teeth during the engagement period.

Once engaged the clutch 27–29 remains engaged even though the direction of drive to the transmission is reversed, such as when the vehicle embodying the illustrated transmission coasts downhill. A bypass check valve 145 in the passage 113 is provided to allow fluid to flow freely from the cylinder 119 to the valve 107 bypassing the restriction 143.

*Operation of FIGURE 1 transmission*

To start the vehicle the main drive clutch 11 is disengaged and the shifter fork members 37, 47, and 69 are moved to establish the desired gear ratio in the rear portion of the transmission. The shifter forks 37 and 47, which can be operated by a conventional shift lever and shifter arrangement, set the three speed gear unit for first, second, third or reverse. For first gear the shifter 37 is moved to mesh gear 33 with gear 31 on the countershaft 21. For second gear the shifter 47 is moved to mesh gear 45 with gear 39 on the shaft 21 and for third gear move to mesh gear 43 with gear 41 on the shaft 21. Reverse gears are obtained by moving the shifter 37 to the left to mesh gear 33 with gear 51.

The planetary gear unit 53–55–59 is conditioned for high speed drive by shifting the fork 69 to cause engagement of teeth 65 with teeth 67 and hence directly connect the shaft 35 with the output shaft 63. The fork 69 can be operated by any suitable means, not shown. The planetary gear unit is conditioned for low speed drive by shifting the fork 59 to engage teeth 68 with teeth 61 connecting the output shaft 63 with the planetary carrier 57, whereby the drive is through the sun gear 53, planet pinions 55 and carrier 57. The stationary ring gear 59 provides torque reaction for drive through the planetary unit in known manner. It will be seen that the planetary unit acts to double the three forward and one reverse speed of the main gear unit.

The main clutch 11 can then be engaged regardless of the condition of the front two speed gear unit. Normally, however, this unit would be conditioned for high drive by moving the valve 107 to the position shown in FIG. 1, whereby fluid under pressure from pump 109 is directed through passage 105 to the friction clutch cylinder 103. This acts to engage the clutch 15 and establish high drive from shaft 13 to the countershaft 21 through gears 17 and 19. While some fluid escapes through the relief port 126, this is a small amount compared to the volume provided by the pump 109 hence pressure acting on the clutch builds up to a value set by the regulator valve 111. The overrunning jaw clutch 27–29 then automatically overruns since the member 29 is driven at a faster rate than member 27 resulting in a separation of the teeth 125 and 127 against the force of the biasing spring 141. At this time the pressure in chamber 119 is relieved through the one way bypass check valve 145 and the valve 107 to the sump 115. As the clutch overruns, the piston 29 is moved by the action between the teeth so that the flange portion 30 is in a position where it no longer blocks the relief port 133 and any remaining pressure in the chamber 119 is immediately relieved through the port 131 and port 133.

The two ratios obtainable from the front friction clutch control unit act to double the total number of working speeds of the transmission. Thus, the vehicle can be started in either high or low range on any of the six speeds forward or two reverse speeds and a shift under power can be made from a low to high or from a high to low. The gears 17, 19, 23, and 25 are dimensioned so as to provide approximately a twenty five percent increase in torque and a corresponding decrease in speed when changing from a high to a low ratio in the two speed unit. When shifted from low back to high approximately a thirty percent increase in speed and corresponding decrease in torque will be obtained.

The transmission shown in FIG. 1 has an inherent hill holding feature. With the clutch 15 engaged and the vehicle pulling a load up the grade in either forward or reverse gear and the main cutch 11 is disengaged, the vehicle will come to a stop and hold its position on the grade. This is caused by the gear trains 19–17 and 25–23 each attempting to drive the shaft 13 at a different speed due to the reverse drive of jaw clutch 27–29. Since this drive at two different speeds cannot occur, the shaft 21, and hence the vehicle, cannot move backwards. Engagement of clutch 11 will again cause clutch 27–29 to overrun and a forward or reverse drive of the vehicle will resume.

If the vehicle should encounter conditions requiring a lower gear ratio in the transmission, such as a change in ground inclination, the operator can establish this lower ratio by merely shifting the valve 107 to the right. This acts to disconnect the pump 109 from the high clutch cylinder 103 and the pressure acting on piston 101 immediately begins to drop at a rate depending on the flow of fluid out of the relief passage 126. If the vehicle engine is operating at a high speed, this rate will be relatively high due to the centrifugal force in the cylinder 103; whereas, if the engine speed is slow, the drop in pressure will be at a lower rate.

As the clutch 15 begins to disengage the engine speeds up and gear 25 is driven faster and when the speed of the jaw clutch member 29 is equal to that of the gear 25 and member 27, the spring 141 moves member 29 to the left with the teeth in the members taking the engaged position shown in FIG. 1. The drive from shaft 13 to the countershaft 21 is in through the gear 23 and 25. At this time the pressure in chamber 119 is allowed to build up by cutting off the relief passage 133. Simultaneously with the cutoff of pressure to the high clutch cylinder, the valve 107 directs fluid from the pump 109 to the low clutch chamber 119. Restriction 143 controls the rate of flow into that chamber so that the pressure on the piston does not build up until after the jaw teeth have been engaged by the spring 141. This pressure build up is also prevented by the relief of any pressure in chamber 119 through the ports 131 and 133 until the piston 29 has moved so that the flange 30 cuts off the port 133. After the teeth have engaged the pressure then rapidly rises to that maintained by the regulated valve 111.

In the event that the vehicle enters into a coast position resulting in a reversal of torque through the transmission, the pressure acting in the chamber 119 is sufficient to prevent separation of the jaw teeth even under high instantaneous loads.

When the conditions requiring the lower gear ratio no longer exist, the operator merely shifts the valve 107 back to the position shown in FIG. 1. Fluid is again applied to the high clutch cylinder 103 to engage clutch 15, causing an increase in speed of the gear 17 and 19 as well as the jaw clutch member 29. Because of the shape of the teeth 125–127 and the axial spline 123, the teeth separate against the force of the spring 141. Fluid in the cylinder 119 freely escapes through the bypass valve 145 and valve 107 to the sump 115 and therefore does not interfere with the separation. The clutch 27–29 is therefore again in its overrun condition.

The power take-off shaft 9 can be connected and disconnected to and from the engine at any time of operation of clutch 3. The drive is thus through the clutch 3, gears 5 and 7 and the shaft 9.

The high ratio hydraulically actuated two-way friction clutch 15 could be made in other forms such as a controlled fill and empty coupling. The gear trains 17–19 and 23–25 could also comprise other forms of gearing, for example planetary gearing. Similarly the low ratio establishing jaw clutch 27–29 could be in a form of a reaction or brake device connecting the gear reaction member to a stationary portion of the transmission.

Figure 4:
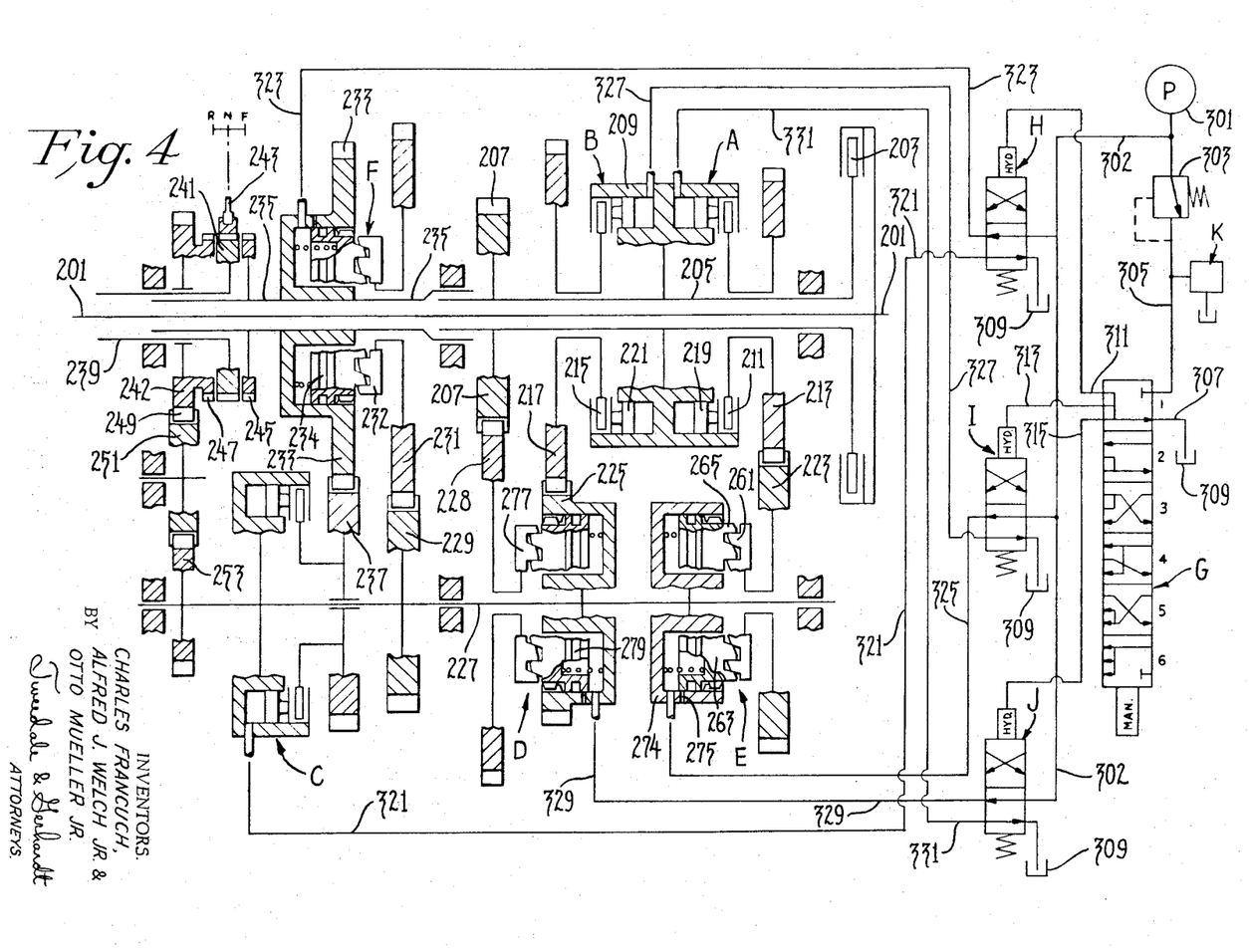
FIG. 4 is a schematic and diagrammatic illustration of a different or modified power shift transmission having six speeds.
Figure 5:
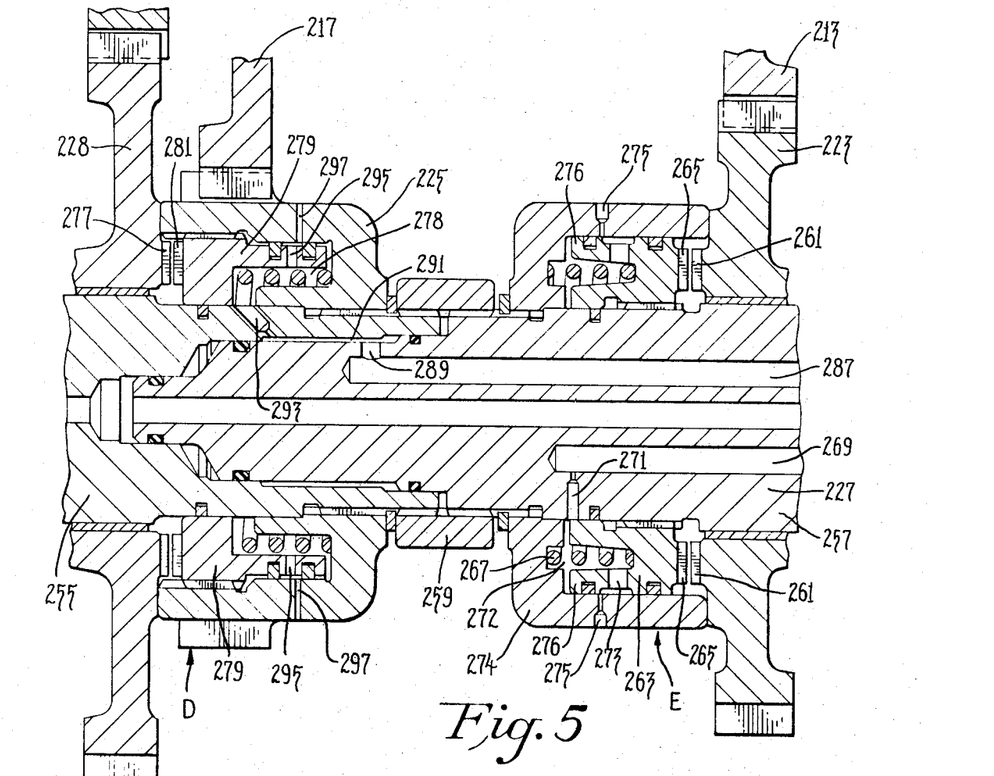
FIG. 5 is a detailed cross sectional view for a portion of the transmission of FIG. 4 showing details of two of the overrunning clutches and their control elements.
Figure 6:
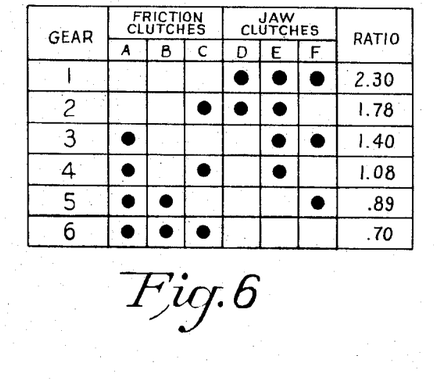
FIG. 6 is a chart showing how the various clutches in the transmission of FIG. 4 are controlled to provide for the six forward speeds.

In FIGS. 4 and 5 and the chart in FIG. 6 is shown a six speed transmission utilizing the invention. Unlike the transmission of FIG. 1 which has only a single overrunning clutch and fluid actuated friction member, the transmission shown in FIG. 4 includes three sets of overrunning clutches and three hydraulically actuated friction clutches. These three overrunning clutches and three friction clutches together act to give a total of six forward speeds. The six forward speeds can be controlled by a single, six position manual valve.

Referring now to FIG. 4, which schematically and diagrammatically shows the transmission, 201 represents the input shaft which is connected to an engine not shown. The input shaft 201 extends completely through the transmission and can form a line or constant drive for power take-off shaft not shown. A single main clutch 203 connects the input shaft 201 to an intermediate sleeve shaft 205. The shaft 205 has secured thereto a gear 207 and a double clutch hub member 209.

The clutch member 209 includes a first clutch unit, generally designated A, that includes a disc portion 211 connected to drive a gear 213. A second clutch, generally indicated B, includes a disc 215 connected to drive another gear 217. The clutch unit A includes a piston 219 to connect to the disc 211 the member 209. Clutch B includes a piston 221 to connect disc 215 to 209. The gear 213 controlled by the clutch A is in constant engagement with a gear 223 while the gear 217 controlled by the clutch unit B is in constant engagement with a gear unit 225.

The gear unit 225, which is the form of a bell shaped member secured to a countershaft 227. The member 225 encloses an overrunning jaw clutch generally designated D and which includes a piston member 279 having jaw teeth that cooperate with jaw teeth 277 on the gear member 228 that is in constant mesh with gear 207 on shaft 205. The gear 223 is rotatable on shaft 227 and carries jaw teeth 261 forming the input of another overrunning clutch unit generally designated E. The unit E includes an annular member 274 secured to the shaft 227 and enclosing an annular piston 263 having jaw teeth 265 that cooperate with the teeth 261 on member 223 in the same way as the previously described overrunning jaw clutch of the transmission of FIG. 1.

Also secured to rotate with shaft 227 is a gear 229 that meshes with a relatively large gear 231 having jaw teeth 232 and which forms the input member to another overrunning clutch unit, generally designated F. A piston unit 234 has jaw teeth and is splined inside of a gear 233 formed on a bell shaped element secured to a forward speed output sleeve shaft 235.

A gear 237 is rotatably mounted on countershaft 227 and is connected to a hydraulically actuated friction clutch unit C. The input to this clutch is secured to the countershaft 227. It will thus be seen that the intermediate shaft 235 can be driven either through the gear 229, 231 and the overrunning clutch F or alternatively through the friction clutch unit C, gear 237 and gear 233.

A forward neutral and reverse unit which acts to connect the transmission with an output shaft 239 includes gear 241 secured to the output shaft 239 and a connecter member 243. The member 243 can be shifted by a suitable shifter fork to connect a forward gear 245 secured to the intermediate shaft 235 or alternatively to connect the gear 241 with a reverse gear member 242. The gear member 242 includes a first gear portion 247 and a second gear portion 249 that meshes with an idler gear 251 that in turn meshes with the reverse gear 253 secured to the countershaft 227 and rotatable therewith.

FIG. 4 schematically shows the hydraulic controls for the three hydraulically actuated friction units A, B, and C as well as the three hydraulically controlled overrunning clutch units D, E, and F. The hydraulic system includes a suitable source of fluid under pressure such as the pump 301, which feeds into a pressure line 302 that will have a relatively high pressure therein whenever the pump is operating. A pressure reducing valve 303 provides a lower pressure in a passage 305 which leads into a six position, ratio control valve generally designated G. The valve G acts to connect the pressure line 305 and a relief line 307, connected to a sump 309, in various combinations with three shift valve control passages 311, 313, and 315. The control passage 311 is connected to the pressure operated end of a pilot operated shift valve generally designated H. The valve H acts to alternatively connect the high pressure line 302 and a relief line leading to the sump 309 with a line 323 leading to the overrunning clutch unit F and a line 321 leading to the friction unit clutch unit C.

In like manner the control line 313 leading from the manual valve G leads to the pressure actuated end of a shift valve, generally designated I, that alternatively controls the connection between the high pressure line 302 and a relief line leading to the sump 309, and first pressure passage 325 leading to the overrunning clutch unit E and a second pressure passage 327 leading to the friction clutch unit B. A third shift valve, generally designated J, is controlled by pressure in the line 315 and alternatively acts to connect the pressure line 302 and a relief line leading to the sump 309, alternatively with a pressure passage 331 leading to the hydraulic friction clutch unit A and the pressure line 329 leading to the overrunning clutch unit D.

The pilot operated shift valves H, I, and J are each a two position valve biased into the upper positions shown in FIG. 4 and operated by hydraulic fluid pressure from valve G to the lower positions. The ratio selector valve G, which as aforesaid mentioned is a six position valve, in its first position as shown in FIG. 4, acts to connect the three valve control passages 311, 313 and 315 to the relief line 307. The low pressure passage 305 is at that time blocked. In the number 2 position of the valve, pressure is admitted to passage 311 and acts to move the pilot valve H to its lower position. At this time the passages 313 and 315 are still connected to sump. In the number three position the pressure from line 305 is connected to the control passage 315 leading to the pilot valve J. The other two control passages 311 and 313 are connected to the relief line 307. In the number four position control lines 311 and 315 are pressurized while the control line 313 leading to the valve unit I is exhausted. In the number five position of the valve G, passage 305 is connected with lines 313 and 315 to actuate valves I and J with control line 311 exhausted. The sixth and final position of the valve G acts to pressurize all three control valve passages 311, 313 and 315 to cause the three valves H, I, and J to be in their lower positions.

FIG. 6 shows the six different combinations of friction and overrunning clutches that are controlled by the three shift valve units H, I and J to provide the six forward speeds. It should be noted that whenever a friction clutch unit is engaged, there is a corresponding overrunning clutch unit that has no fluid pressure on it whereby the unit can be allowed to overrun. Thus, each pair of overrunning clutch and friction clutch units can be controlled by a two position valve such as valves H, I, and J, which in one position acts to supply fluid under pressure to the friction clutch unit and then the other position to supply fluid under pressure to the overrunning clutch units.

FIG. 5 shows a detailed cross section of the FIG. 4 transmission unit and shows one detailed form that the overrunning clutch units D and E may take. In FIG. 5 the reference numbers of parts corresponding to the clutch schematically in FIG. 4, are the same while parts not shown in the schematic FIG. 4 are also indentified by numbers. It will be seen that the intermediate shaft 227 is shown as a single shaft in FIG. 4. For ease of assembly, there are actually two shafts 255 and 257, the shaft 257 piloting into shaft 255. The adjacent ends of the shafts have external splines and a coupling member 259 bridges the two shafts to provide a driving connection between the same.

The overrunning clutch unit D which includes the input gear 223 has clutch teeth 261 and an annular piston unit 263 having jaw clutch teeth 265 formed thereon. A spring 267 acts to bias the piston unit 263 into tooth engaging position. (FIG. 4) A passage 269 formed in the shaft 257 leads to a radial passage 271 opening into the pressure chamber 272 formed by the bell shaped member 274 and the shaft 257.

The piston 263 is splined on the shaft 257 and has formed therein a radial passage 273. A relief passage 275 is formed in the bell shaped member 274. It will be seen that the land 276 on the piston 263 acts to control the connection between the passage 273 and the relief passage 275.

The overrunning clutch unit D shown on the left of FIG. 5, includes the gear 228 which has teeth 277 formed thereon. The gear 225 is a bell shaped member similar to the member 274 and forms therein a cylinder 278 in which it is axially slideably mounted piston 279 which is splined to the inside of the bell shaped gear member 225. The piston member 279 has jaw teeth 281 formed thereon which cooperate with the teeth 277 on the gear member 228 to provide an overrunning clutch. Fluid control of the piston 279 is obtained through the passage 287 drilled in the shaft 257, a radial passage 289, a relief groove 291 and a radial passage 293 formed in the shaft 255. The piston 279 has a radial passage 295 formed therein between two annular seal members, and connects to a relief passage 297 formed in the bell shaped gear member 225. It will be seen that the annular seal on the piston 279 acts to control the relief passage 297 and insure that the pressure will be built up on the piston in the chamber 278 only when the teeth are in engaged position.

*Operation of FIG. 4 transmission*

Forward drive is established by movement of coupler 241 by fork 243 to couple output member 239 to the gear 245 and shaft 235. The valve G is then set for any desired gear ratio, which ratio will be determined by the operation of the three shift valves H, I and J which control the operation of the three one-way and three two-way clutches A, B, C, D, E, and F. The main clutch 203 can then be engaged to complete the drive between the input shaft 201 and the output shaft 239. For the purposes of illustration the various gear sets of the transmission of FIG. 4 could have the following ratios: gears 207–228, 1.58; gears 213–223, .96; gears 217–225, 0.61; gears 229–231, 1.46; and gears 237–233, 1.13. FIGURE 6 shows the overall gear ratios obtained with the foregoing individual ratios.

The master valve G, as previously stated, acts to direct fluid under pressure from the pump 301 to the three shift valves to condition the same in any of the six combinations shown in FIG. 6. The valve G can be moved between any two positions or ratios during operation of the vehicle incorporating the transmission. In the 1st gear position all three control lines 311, 313 and 315 are connected to exhaust line 307 allowing the valves H, I, and J to be moved by their springs to their upper positions. In this condition pressure is fed to lines 323, 325 and 329 while lines 321, 327 and 331 are connected to exhaust. Thus, the three friction clutches A, B and C are disengaged. The drive is from the main clutch 203, shaft 205, gears 207, 228 and jaw clutch D to the intermediate or countershaft 227. The drive continues from shaft 227 to gears 229, 231 and jaw clutch F to the forward output shaft 235. The coupler 241 then completes the drive to the output shaft 239. Since the gears 207–228 provide the lowest speed drive (1.58:1) between the input shaft 205 and intermediate shaft 227 and the gears 229–231 provide the lowest speed drive (1.46:1) between the shaft 227 and the forward output shaft 235, the transmission will be in its lowest overall or first gear (2.30:1).

With fluid under pressure supplied to jaw clutches D and F, these units are prevented from overrunning by the fluid pressure aiding their respective springs. When the jaw teeth are in engagement, the relief ports in the jaw clutch units are cut off by the piston like toothed members and the fluid pressure is allowed to build up to prevent overrun. Thus, if the vehicle is traveling downhill or otherwise coasting, there will be a positive drive from the output shaft 239 to the engine shaft 201. To obtain second speed the valve G is moved to its number 2 position. The control lines 313 and 315 remain connected to exhaust 307 but shift valve control line 311 is now pressurized to cause shift valve H to be moved downward. Pressure from line 302 is then directed to line 321 leading to the friction clutch unit C. At the same time, the line 323 connected to the jaw clutch unit F is connected to sump 309. Pressure on line 321 builds up on clutch C until gear 237 is driving gear 233 and connected driven jaw clutch member faster than the driving jaw clutch member is driven by gears 229 and 231. At that time the torque on the teeth causes the same to separate against the spring and overrun. The pressure on clutch C then builds up to the full value determined by regulator valve 303. Drive is then through gears 207–228, clutch D, shaft 227, clutch C, gears 237–233 and the forward output shaft 235. Since gears 237 and 233 provide a higher speed drive (1.13:1) than gears 229–231, the overall drive between shaft 201 and 239 is higher (1.78:1).

Movement of valve G to its number 3 position causes both valve H and J to change with valve H again being allowed to return to its upper position to deenergize clutch C and allow pressure to be fed to clutch F. With valve J moved down by pressure in line 315, it then directs high pressure oil to line 331 and clutch A while permitting clutch D and line 329 to exhaust. As clutch A is applied gear 213 begins to drive gear 223 and member 261. When the drive through gears 213, 223 and overrun clutch E is faster than that through gears 207–228 and clutch D, clutch D overruns. At this time the drive between the input shaft 201 and the shaft 227 is in its intermediate speed ratio (.96:1) while the drive between shaft 227 and the forward output shaft is in its low speed ratio (1.46:1). This is third gear or 1.40:1 overall ratio.

Fourth gear is obtained by moving the valve G to its number four position. Valves H and J are then caused to move to their lower position with valve I still in its upper position. This is a change in valve H only and causes clutch C to again be applied and clutch F allowed to overrun when clutch C takes up the drive. The overall drive is then with the drive between shafts 201 and 227 in intermediate speed ratio (.96:1) and the drive between shafts 227 and 235 at high ratio (1.13:1). The overall ratio in 4th gear is 1.08:1.

Movement of valve G to its fifth gear position acts to allow valve to return to its upper position wherein clutch C is disengaged and pressure is available to hold jaw clutch F from overrunning. Valve J remains in its lower position wherein clutch A is energized and jaw clutch D is allowed to overrun. Valve I is now urged down by pressure in line 313 to supply pressure to clutch B and allow holding pressure on clutch E to exhaust. The drive is then from shaft 205, clutch B and gears 217–225 to shaft 227. This is the highest drive (.61:1) between shafts 205 and 227. With clutch C again deenergized the drive from shaft 227 to shaft 235 is at a low ratio (1.46:1) and thus the overall drive is .89:1.

The highest or sixth speed is obtained by moving the valve G to its last position wherein pressure is supplied to each of the shift valves H, I and J to move them to their lower positions. All three friction clutches A, B and C are then engaged while the one-way clutches D, E and F are allowed to overrun. The drive is through clutch B, gears 217–225 (.61:1) and clutch C and gears 237–233 (1.13:1). The overall ratio in 6th gear is .70:1.

It should be noted that any change in ratio between any of the six speeds will involve a one-way jaw clutch engaging or disengaging. Thus, the torque directional characteristics of this type of clutch is fully utilized in the transmission of FIG. 4 and no elaborate hydraulic control system with rate controls, timing devices, pressure regulators are necessary to obtain shifts while drive is transmitted. In each case there is a positive, non free wheeling drive in a reverse direction so that effective engine braking is available to aid the vehicle wheel brakes.

The transmission of FIG. 4 is conditioned for reverse gear by shifting coupler 243 to the left to couple teeth 247 on gear 249 to the output shaft 239. The gear 253, idler 251 and gear 249 provide a ratio of 1.36:1 between shaft 227 and shaft 239. When the transmission is in reverse the gear sets 229–231 and 237–233 are ineffective, thus the main control valve G will not cause any change in ratio between 1st and 2nd position, between 3rd and 4th, and between 5th and 6th. There are, therefore, three overall ratios obtainable in reverse depending on the condition of the clutches A, B, D and E. The three reverse ratios are 2.15:1, 1.31:1 and 0.83:1. These can be obtained by moving the valve G in either 1st or 2nd to obtain the lowest reverse speed, in either 3rd or 4th to obtain the intermediate reverse speed, or 5th or 6th to obtain the highest overall speed.

It should be noted that other gearing can be used in series with either the transmission of FIG. 1 or that of FIG. 4, and if such gearing is of multiple speed type, additional ratios can be obtained. For example, a two speed gear unit is placed in series with that of the six speed unit of FIG. 4, there will be 12 total speeds available. Of course the ratio of this unit must be chosen so that in one condition it provides overall ratios intermediate those provided by the six speed unit.

One feature of the present invention is that the transmissions shown have a hill holding operation in the higher gear ratios. That is, if the vehicle is climbing an incline and the main clutch is disengaged, the vehicle will be prevented from backing down. This is due to the inherent reverse drive characteristics of the jaw clutches. If any of the two-way friction clutches such as clutch A, B, or C in FIG. 4, are energized, which is the case in all gear ratios except first, there will also be a parallel reverse direction drive connection through a jaw clutch. For example, if clutch C is engaged (2nd, 4th, and 6th gears) to establish two-way drive through gears 233–237, then there will also be a parallel drive through the jaw clutch unit F and gears 231–221. Since these gears provide different ratios, there can be no drive at all and the vehicle is prevented from reverse movement.

If clutch C is disengaged and clutch A engaged (3rd gear) there will be reverse drives through jaw clutch D and gears 228–207 as well as through clutch E, gear 223–213 and clutch A. Again no reverse movement is possible. Likewise if clutch B is applied and clutch C released (5th gear), there will be at least two parallel positive drive connections and no reverse movement can take place.

While this hill holding feature is of considerable advantage, there are times when it is undesirable. This is particularly true when the operator wishes to make a manual shift such as moving the fork 243 between forward and neutral or in changing another gear set in series with the main transmission. In such a case the drive must be released in order to take the hill holding torque off the member being shifted, (i.e. teeth on coupler 241). In order to accomplish this release, the valve G can be shifted to 1st speed position. Alternatively, a dump valve can be provided, such as valve K in FIG. 4, that will relieve the pressure acting in line 305 and hence on top of valves H, I and J, so that the transmission will automatically downshift to first gear wherein there are no parallel two-way drive trains effective. The valve K can be operated in response to full movement of the control for clutch 203 so that upon partial release of clutch 203 there is hill holding but upon full operation the transmission will downshift and the torque will be relieved allowing shifting of manually moved gears.

It is to be understood that the two-way clutches described in this specification and recited in the following claims may be of any suitable form and are shown as hydraulic actuated friction disc clutches for illustration. Also the term one-way clutches, unless otherwise limited, is considered to include forms other than those shown. Other changes, modifications and applications will be readily apparent to those skilled in the art and are deemed to be within the scope of the invention which is limited solely by the following claims.

We claim:

1. A change speed transmission including a driving shaft and a driven shaft, first gear means for transmitting drive between said shafts at one gear ratio, first fluid pressure controlled drive establishing means for establishing and disestablishing two-way drive between said shafts through said first gear means, second gear means for transmitting drive between said shafts at a second gear ratio, second drive establishing means for establishing and disestablishing one-way drive between said shafts through said second gear means, said second drive means being of the overrunning jaw clutch type including a pair of rotatable members having cooperating teeth that are urged into engagement by a bias force to provide positive drive between the members when one member is driven faster than the other member and normally act to separate against said bias force and hence overrun when the other member is driven faster than said one member, means for preventing said drive establishing means from overrunning including a fluid pressure operated piston acting to prevent separation of said cooperating teeth, selective means to direct fluid under pressure to said fluid pressure to said fluid pressure controlled drive establishing means or alternatively to said piston, and pressure control means to prevent the pressure acting on said piston to build up to an effective value when the cooperating teeth are separated, and allow the pressure to build up to an effective value when the teeth are in driving engagement, whereby the force acting to move the teeth into engagement is substantially less than that acting to keep the teeth in engagement.

2. The change speed transmission of claim 1 wherein said pressure control means includes a pressure relief port controlled by movement of said piston.

3. The change speed transmission of claim 1 wherein said piston is operable in a pressure cylinder to form an expansible chamber having an inlet port of predetermined area and a relief port having an area larger than the inlet port, said piston acting to open and close said relief port depending on its position, said piston acting to close said relief port and allow pressure in said chamber to build up only after movement of said piston into a position wherein said cooperating teeth are in positive engagement.

4. A transmission providing a plurality of gear ratios between a driving shaft and a driven shaft, a first gear rotatably mounted on said driving shaft, a fluid operated friction clutch for connecting said first gear to said driving shaft, a second gear having a smaller diameter than said first gear mounted on said driving gear for rotation therewith, a third gear mounted on said driven shaft for rotation therewith and meshing with said first gear, a fourth gear rotatably mounted on said driven shaft and meshing with said second gear, an overrunning jaw clutch having a first portion connected to said fourth gear and a second portion connected to said driven shaft, said first and second portions having cooperating opposed teeth, means biasing said first and second portions together to provide positive drive between said fourth gear and said driven shaft through said teeth, said teeth construction to normally separate against the force of said biasing means when said second portion is driven faster than said first portion, fluid pressure operated piston means for holding said portions together to prevent separation of said teeth, and fluid pressure control means for alternatively supplying fluid pressure of a predetermined level to said friction clutch or to said piston means whereby said driving and driven shafts are alternatively connected by said control means for two-way drive therebetween either through said second gear, fourth gear and jaw clutch or through said friction clutch, first gear and third gear, and means for limiting the fluid pressure acting on said piston means to a level substantially below said predetermined level when the opposed teeth on said first and second overrunning jaw clutch portions are separated, said last means including a relief port controlled by movement of the piston means.

5. A drive establishing means of the overrunning jaw clutch type including a pair of rotatable members having cooperating teeth that provide positive drive between the members when one member is driven faster than the other member and normally act to separate and hence overrun when the other member is driven faster than said one member, means for preventing said drive establishing means from overrunning including a fluid pressure piston acting to prevent separation of said cooperating teeth, means to selectively direct fluid under pressure to said piston, and pressure control means to cause the pressure acting on the piston to be substantially lower when the teeth are separated than when the teeth are in driving engagement, whereby the force acting to move the teeth into engagement is less than that acting to keep the teeth in engagement.

6. The drive establishing means of claim 5 wherein said pressure control means is responsive to the position of the piston.

7. The drive establishing means of claim 5 wherein said piston is operable in a cylinder and wherein said pressure control means includes a pressure relief port formed in the cylinder, said port acting to relieve a portion of the pressure of the fluid from said selective means acting on said piston, and said piston acting to close said port when said cooperating teeth are in positive driving relationship.

8. An overrunning clutch assembly including a shaft member, an input member rotatably mounted on said shaft, a bell shaped driven member forming an annular cylinder and splined on said shaft and secured against axial movement, an annular piston member enclosed within said annular cylinder and slideable with respect to said shaft, said piston having a front radial face and a rear radial face, means to transmit drive between said piston and said shaft, cooperating jaw teeth on a radial face of said input member and the front radial face of said piston, spring means in said bell shaped member urging said piston toward said input member, seal means between said piston and said shaft and said bell shaped member, a fluid inlet port in said shaft leading into said bell shaped member behind said rear radial face of said piston, a relief port in said bell shaped member means on said piston acting to close said relief port when said teeth are engaged and allowing build up of fluid pressure on said piston to hold said teeth in engagement, and open said cylinder to said relief port when said teeth are disengaged to allow movement of said piston into tooth engagement solely by said spring.

9. The clutch assembly of claim 8 wherein said means to transmit drive between said piston and said shaft comprises a splined connection between said piston and shaft.

10. The clutch assembly of claim 8 wherein said means to transmit drive between said piston and said shaft comprises a splined connection between said piston and said bell shaped member and said shaft.

11. A six speed transmission having an input shaft, a countershaft and an output shaft, first drive means including a first pair of gears and a first overrunning clutch between said input shaft and said countershaft, second drive means including a first two-way clutch, a second pair of gears and a second overrunning clutch between said input shaft and said countershaft, third drive means including a second two-way clutch and a third pair of gears between said input and countershafts, said first, second and third drive means providing three speed ratios between said input and countershafts, a fourth drive means including a third overrunning clutch and a fourth pair of gears between said countershaft and said output shaft, a fifth drive means including a third two-way clutch and a fifth pair of gears between said countershaft and output shaft, said fourth and fifth drive means providing two speed ratios between said countershaft and said output shaft and means for controlling and actuating said first, second and third two-way clutches to obtain said six speeds between said input and output shafts.

12. The transmission of claim 11 wherein fluid actuated overrun control means are provided to prevent said first, second and third overrunning clutches from overrunning, said last mentioned means being operable in synchronism with control of said two-way clutches.

13. The transmission of claim 12 wherein said fluid actuated two-way clutches and said fluid activated overrun control means are controlled by three two position shift valves, said first overrunning clutch and said first two-way clutch controlled by a first shift valve, said second overrunning clutch and said second two-way clutch controlled by a second shift valve and said third overrunning clutch and said third two-way clutch controlled by a third shift valve, said shift valves each being operable in one position to cause actuation of its respective two-way clutch and in a second position to cause actuation of its respective overrunning clutch, said third shift valves being selectively operable in various combinations to provide for said six speeds.

14. The transmission of claim 13 wherein a manually controlled selector valve is provided, said shift valves being operable by fluid under pressure from one of its positions to the other position, said manually controlled selector valve having six positions directing fluid to said three shift valves in said various combinations to provide said six speeds in accordance with the selected position of said selector valve.

15. The transmission of claim 11 wherein said overrunning clutches are of the jaw tooth type which normally provide a positive drive in one direction but will overrun when the drive is in the other direction and wherein fluid actuated means are provided to selectively prevent overrun of each clutch.

16. The transmission of claim 11 wherein said overrunning clutches are of the jaw tooth type which act to provide a positive torque drive in one direction through the clutch when the teeth are in engagement and will tend to automatically separate and overrun when the drive is in the other direction and fluid actuated means for each clutch selectively preventing separation of the jaw tooth after they are engaged.

17. The transmission of claim 16 wherein said first, second and third two-way clutches are actuated by fluid and fluid pressure control of distribution means for selectively directing fluid to said two-way clutches and said fluid actuated means of overrunning clutches to provide for selective establishment of said first, second or third drive means and simultaneous selective establishment of said fourth and fifth drive means.

18. A change speed transmission having a first shaft and a second shaft, first drive means including a first pair of gears and a first overrunning clutch between said first and second shafts, second drive means including a first two-way clutch, a second pair of gears and a second overrunning clutch between said first and second shafts, third drive means including a second two-way clutch and a third pair of gears between said shafts and said first, second and third drive means providing three speed ratios between said shafts, and means for controlling and actuating said first and second two-way clutches to obtain said three speeds between said shafts.

19. The transmission of claim 18 wherein fluid actuated overrun control means are provided to prevent said first and second overrunning clutches from overrunning, said last mentioned means being operable in synchronism with control of said two-way clutches.

20. In a multi-speed transmission having a first shaft, a second shaft and an intermediate shaft, a first two-speed driving unit including a two-way clutch for establishing two-way drive between the intermediate shaft and said first shaft at a first speed ratio and a one-way clutch for establishing drive between the intermediate shaft and the first shaft at a second speed ratio, a second two-speed drive unit in series with the first two-speed drive unit and including a two-way clutch for establishing two-way drive between the intermediate shaft and the second shaft at a first speed ratio and one-way clutch for establishing drive between said intermediate shaft and said second shaft at a second speed ratio, and a third speed establishing drive unit including a one-way clutch and a two-way clutch arranged to establish a third speed drive in parallel to each of the drives established by the second driving unit, and means for controlling the drive establishment and disestablishment of the two-way clutches of said first, second and third units so that six different speed ratios may be selectively established between said first and second shafts through controlled selective energization of the three two-way clutches while causing all speed changes between adjacent ratios to be effective only by engagement or disengagement of one of the one-way clutches of said drive units.

21. The transmission of claim 20 wherein said one-way clutches comprise normally overrunning clutches of the jaw tooth type and means are provided to at times prevent overrunning of said one-way clutches.

22. The transmission of claim 21 wherein said means for controlling the drive establishment and disestablishment comprises a hydraulic system including a source of fluid under pressure, a first plurality of pressure operated means for said two-way clutches and valve means for selectively directing the fluid under pressure to said pressure operated means, a second plurality of pressure operated means for preventing overrunning of said jaw tooth clutches, said valve means selectively directing fluid under pressure to said second plurality of pressure operated means for causing two-way drive between said first and second shafts through said one-way clutches and said two-way clutches in each of the six speed ratios.

23. The transmission of claim 20 wherein the transmission includes a main clutch, and means are provided to cause disestablishment of all the two-way clutches in response to operation of said clutch whereby said transmission is in its lowest overall speed ratio when the main clutch is disengaged.

References Cited
UNITED STATES PATENTS
| | | | |
|---|---|---|---|
| 3,134,471 | 5/1964 | Croswhite | 192—44 |
| 3,302,475 | 2/1967 | Elfes et al. | 74—368 |

FOREIGN PATENTS
| | | |
|---|---|---|
| 1,063,209 | 4/1954 | France. |

DONLEY J. STOCKING, *Primary Examiner.*

H. S. LAYTON, *Assistant Examiner.*